Sept. 30, 1924.  1,510,055

H. F. HALDEMAN

LOADING RACK FOR WAREHOUSES

Filed March 5, 1923   2 Sheets-Sheet 1

Inventor
Harry F. Haldeman
By Lyon & Lyon
Attys.

Sept. 30, 1924.  
H. F. HALDEMAN  
LOADING RACK FOR WAREHOUSES  
Filed March 5, 1923  2 Sheets-Sheet 2

Inventor  
Harry F. Haldeman  
By Lyon & Lyon  
Attys.

Patented Sept. 30, 1924.

1,510,055

UNITED STATES PATENT OFFICE.

HARRY F. HALDEMAN, OF LOS ANGELES, CALIFORNIA.

LOADING RACK FOR WAREHOUSES.

Application filed March 5, 1923. Serial No. 622,808.

*To all whom it may concern:*

Be it known that I, HARRY F. HALDEMAN, a citizen of the United States, residing at Los Angeles, in the county of Los Angeles and State of California, have invented a new and useful Loading Rack for Warehouses, of which the following is a specification.

In supplying lengths of rod-like material such as pipe, rods, or other long articles, from warehouses, it is frequently necessary to collect, at one point, a quantity of the pipe or rods of different diameters or sizes. The different sizes are usually carried in regular storage racks and the collection of the material to supply a given order, often entails considerable labor. It is also sometimes necessary to deliver the material onto a truck at the side of the warehouse, but in many cases it is merely necessary to collect the required pipe on a hand truck within the warehouse.

The general object of the present invention is to provide a rack which will facilitate the delivery of material of this nature from a warehouse and which, in use, will save time and trouble in the collecting of the different sizes of the pipe or rods which are required to fill an order. More specifically, one of the objects of the invention is to provide a rack for the temporary storage of different sizes of pipe or rods, having compartments which are readily accessible and above which skidding rails are provided, which facilitate the delivery of the pipe from the rack, but which do not interfere with the accessibility of the compartments; also to provide simple means adapted to cooperate with an overhead hoisting cable for facilitating the delivery of the pipe at will onto a truck at the side of the warehouse or onto a small collecting truck within the warehouse.

Further objects of the invention will appear hereinafter.

The invention consists in the novel parts, and combination of parts to be described hereinafter, all of which contribute to produce an efficient loading rack for warehouses.

A preferred embodiment of the invention is described in the following specification while the broad scope of the invention is pointed out in the appended claims.

Figure 2:
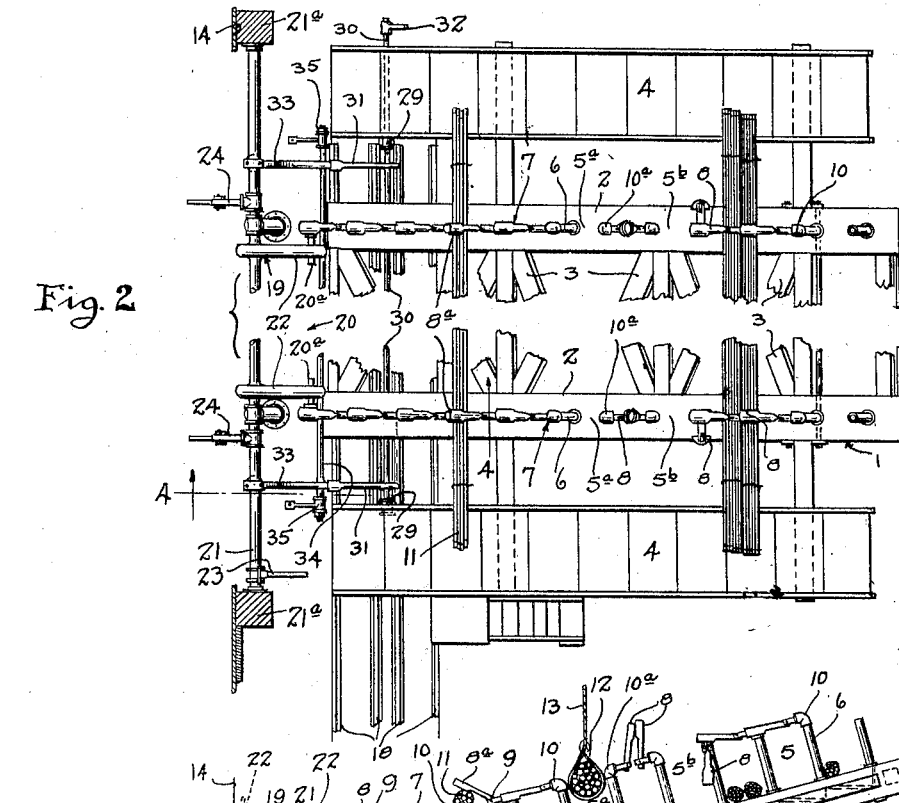
Fig. 2 is a plan of the loading rack, the middle portion of the rack being broken away, certain posts at the side of the warehouse being shown in section.

In constructing the rack, I provide a floor 1, which is preferably of skeleton form and which is also preferably slightly inclined so as to facilitate delivery of pipe down the rack, or at the lower end of the rack, which is the delivery end. The floor 1 is constructed of two oppositely disposed stringers 2 which are substantially parallel with each other and connected by cross bracing 3. At each side of the floor 1 I provide stairways 4, which enable workmen to pass up and down at each side, and these stairways facilitate the use of the rack. The upper side of the floor is divided into a plurality of compartments 5 by suitable means, such as uprights, standards or posts 6, and above these compartments I provide a pair of skidding rails 7, said skidding rails being formed of a plurality of sections which correspond to the different compartments, each rail section being composed of a movable part 8, which is connected by joint 9 to a swivel head, indicated generally by the number 10. Each section 8 is supported at its lower end on the standard 6 just below it, so that when the movable parts 8 are all in place, they will cooperate to form a continuous skidding rail at each side of the rack. These skidding rails 7 greatly facilitate the delivery of pipe from the different compartments 5; the different compartments 5 are, of course, used to store temporarily, different sizes of the pipe or rods or other elongated material, for which the rack may be used. These pivoted sections 8 enable individual pipe or a bundle 11 of pipe to be removed simply by raising the pipe until it strikes the under sides of the rail sections $8^a$ near their free ends (see Fig. 1); the rail sections simply swing upwardly and permit the pipe to be removed and they drop back again by gravity, so as to complete the skidding rail as before.

Where it is desired to provide a more complete opening of a compartment, this may be accomplished as indicated at the compartment $5^a$ (see Fig. 1) where the upper dividing post for the compartment is represented with its swivel head $10^a$ rotated around so that the rail section 8, at this point, is out of the way and held in an elevated position by the rail section 8 just above it. At the compartment $5^b$, just above this point, I illustrate another position of the swivel head to clear the way into the compartment from above. In this case the swivel head is simply turned at right angles to the longitudinal axis of the rail. (See Fig. 2.)

Opening the compartment, as indicated at $5^a$, facilitates the placing of a large bundle 12 of the pipe in the compartment, by means of a supporting cable and sling 13, which may also be operated with the warehouse crane to let the bundle of material slide along the rails when guiding the same into a wagon.

Figure 1:
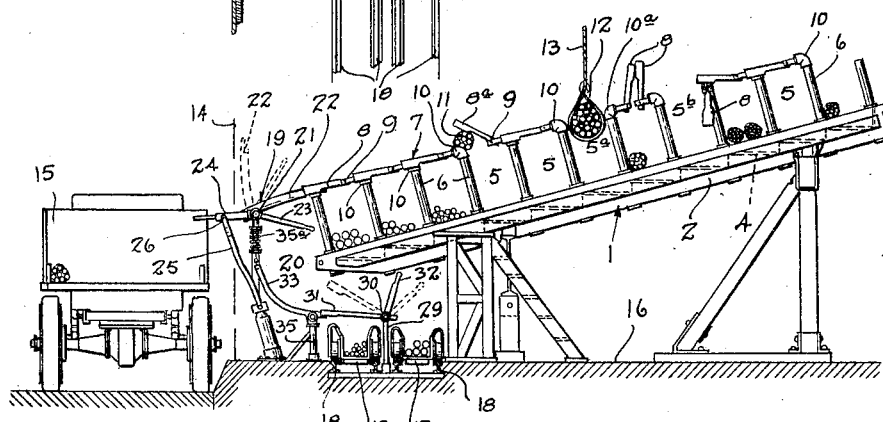
Fig. 1 is a side elevation of my loading rack and illustrating its general construction and mode of operation.
Figure 3:
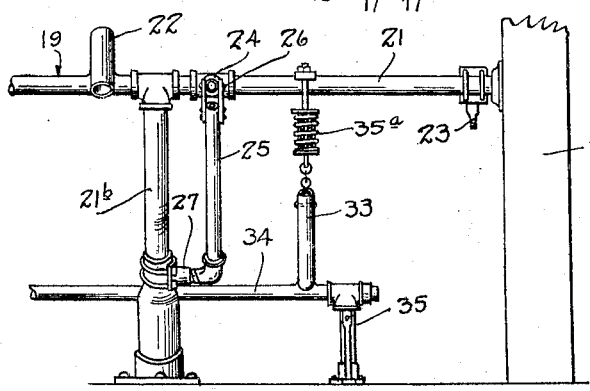
Fig. 3 is a front elevation of one end of the guiding means which is placed at the side of the warehouse.

In Fig. 1 the dotted line 14 indicates the side wall of the warehouse, and I provide means for delivering the pipe beyond this wall and onto an ordinary truck 15, but the construction is such that, if desired, the pipe to fill an order can be delivered at another point, preferably on the floor 16 of the warehouse, near the lower end of the rack. In order to accomplish this, I provide means for facilitating the positioning of collecting means, such as small hand trucks 17 which, if desired, may run on rails 18, forming tracks extending at right angles to the rack.

Near the side wall 14 of the warehouse, I provide guiding means 19 which is located slightly removed from the lower end of the rack, so as to form a gap 20 between the guiding means and the rack. The guiding means operates to bridge this gap, when desired, so that it may guide the pipe across the gap and onto the truck 15, and it operates in such a way that, when desired, it opens the gap and permits the pipe to pass down onto additional guiding means which guides the pipe onto one of the trucks 17.

Figure 4:
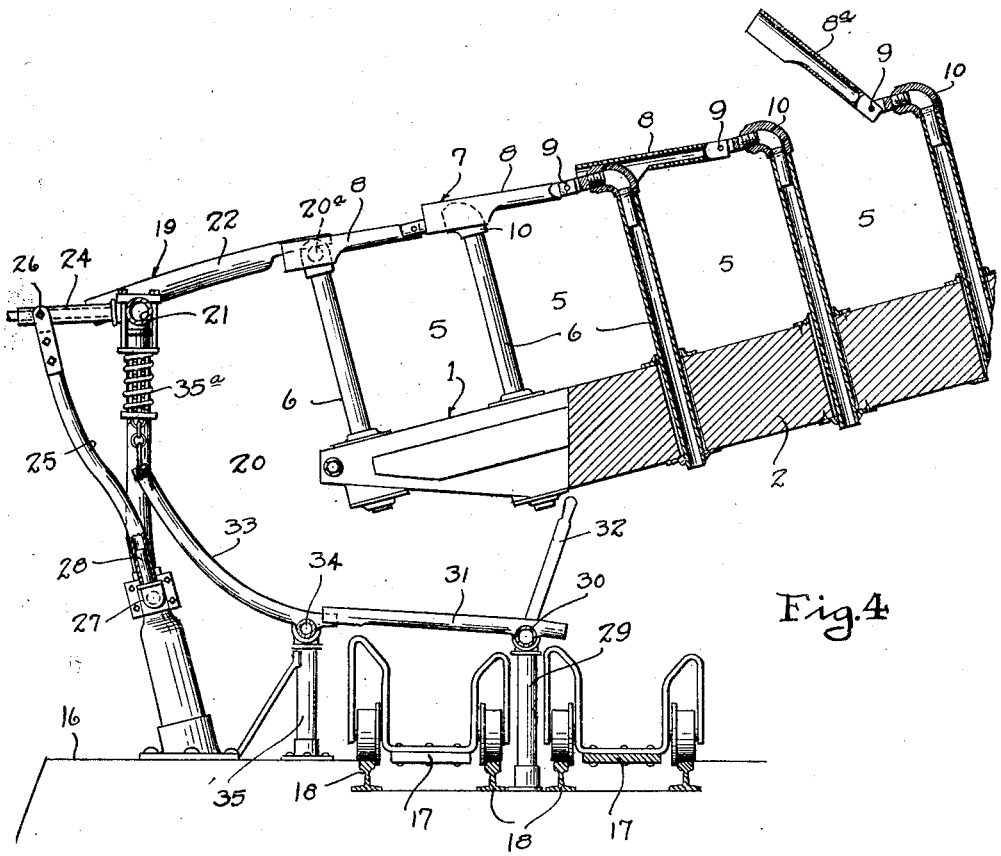
Fig. 4 is a section taken about on the line 4—4 of Fig. 2 upon an enlarged scale, showing a portion of the rack in vertical section and illustrating details of the guiding means that receives the pipe from the floor of the rack.

The guiding means 19 preferably includes a horizontal rock shaft 21, the ends of which are rotatably mounted at posts or columns $21^a$ and on intermediate posts $21^b$; this rock shaft carries two arms 22, which may be disposed in an inclined position, such as shown in Fig. 1, so that they will operate to receive a pipe or bundle of pipe coming down the skidding rails. The shaft may be rocked by means of a rigid lever 23. The upper ends of the arms 22 rest upon the upper side of horizontal studs $20^a$ projecting from the two lowest swivel heads 10; the relation is such that the arms 22 will take the pipe from the skidding rails. In order to guide the pipe out over the body of the truck 15, I provide two out-board arms 24, which are rotatably mounted on the rock shaft 21, each of which is provided with a supporting strut or brace 25, pivotally attached to the arm at 26 and supported at its lower end on a rest 27 projecting from the post $21^b$. The rest includes an upwardly projecting pintle 28, which receives the lower end of the brace; this brace is preferably formed of a bent pipe. (See Fig. 4.) By pulling the brace 25 upwardly, its lower end may be disengaged from the pintle 28, and if both braces are dislodged in this way, the out-board arms 24 may be swung upwardly and inwardly so that they will clear the line 14; they will then permit the warehouse door to be closed.

I may use as many of the trucks 17 as are convenient, and in order to facilitate the delivery of the pipe to the different trucks, I may employ substantially the same construction over the trucks as I employ on the floor of the rack, that is to say—between the tracks I provide standards or posts 29, which may support movable rail sections which will operate to guide the pipe across and above one truck to deliver it to a truck beyond. In the present instance, where only two trucks are employed, as illustrated in Fig. 1, the standards 29 may support a rock shaft 30 having rigid arms 31, which constitute skidding rails, the said rock shaft 30 being provided with a lever 32 at one end, which may be operated to raise the arms 31 in the manner indicated by the dotted lines in Fig. 1. This will enable the pipe to be delivered into the left hand truck; if arm 21 is in the position shown in full lines, it facilitates delivery of the pipe into the right hand truck.

Adjacent the gap 20 I provide guiding means for receiving the pipe through the gap and for guiding the same onto the truck or trucks 17. For this purpose I provide a pair of bent arms 33 secured to a rock shaft 34, supported on short standards 35, (see Fig. 4) and I provide resilient means for absorbing the shock when the pipe or rod falls onto these guide arms. For this purpose the upper end of the arms 33 may be suspended on coil springs $35^a$, which are slung from the aforesaid rock shaft 21.

Figure 5:
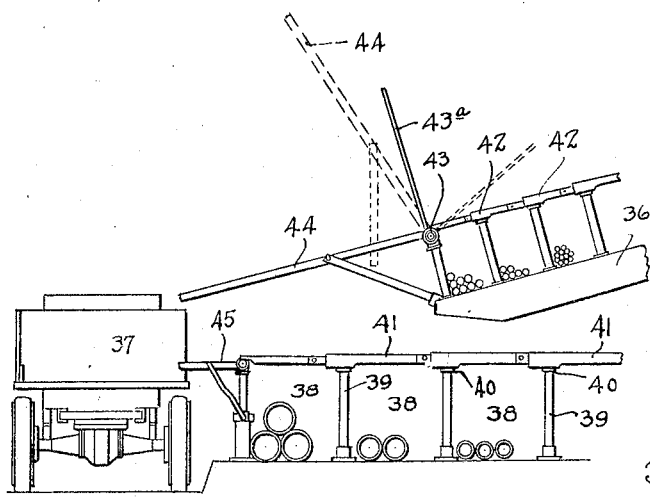
Fig. 5 is a view somewhat similar to Fig. 4, but upon a reduced scale and illustrating an embodiment of the invention, in which the rack includes a lower floor or level with compartments, which may be used conveniently for temporarily holding the larger sizes of the pipe.

If desired, I may provide additional storing space on the floor of the warehouse. Such a construction is illustrated in Fig. 5, in which an inclined upper rack or storing floor 36 is provided with its lower end located a greater distance from the position of a truck 37 at the side of the warehouse, and the floor of the warehouse is then divided into a plurality of compartments 38, by means of standards 39 having swivel heads 40 and pivoted rail sections 41 of substantially the same construction as that illustrated in Fig. 4. These compartments on the floor are convenient for holding pipe of larger sizes and the pivoted rail sections 41 co-operate to produce the skidding rail or rolling rail over the compartments, along which the large pipe may be rolled in taking the same from the compartments or in storing the same in the compartments. I also provide suitable guiding means for guiding the pipe from the lower end of the upper skidding rails 42 onto the truck 37. In the present instance this guiding means comprises a horizontal rock shaft 43 with long arms 44 which extend over and deliver pipe to out-board arms 45, which are constructed, and operated, like the out-board arms 24, already described. When the arms 44 would interfere with the delivery of pipe from the lower compartments they are swung upwardly by means of a lever 43ª into substantially the position indicated by the dotted lines in Fig. 5. The rail formed by the rail sections 41 is substantially at the same level as the out-board arms 45, so as to facilitate the delivery of the pipe from the lower skidding rail onto the out-board arms, which are located slightly above the floor of the truck 37.

It is understood that the embodiment of the invention described herein is only one of the many embodiments this invention may take and I do not wish to be limited in the practice of my invention nor in my claims to the particularly embodiment set forth.

What I claim is:

1. A rack for facilitating delivery of rod-like material of different sizes, from a warehouse, comprising a supporting floor for the material, uprights carried by the floor dividing the same into compartments for the different sizes, and an inclined skidding rail disposed over the compartments with its depressed end located at the side of the warehouse and having movable sections corresponding to the compartments, adapted to be raised to give access to the compartments.

2. A rack for facilitating delivery of rod-like material of different sizes, comprising an inclined supporting floor for the material, uprights carried by the floor dividing the same into compartments for the different sizes, and an inclined skidding rail disposed over the compartments and having movable sections corresponding to the compartments, adapted to be raised to give access to the compartments, and a hoisting cable for letting bundles of the material slide down the rails.

3. A rack for facilitating delivery of rod-like material of different sizes, comprising a supporting floor for the material, uprights carried by the floor dividing the same into compartments for the different sizes, a skidding rail supported on the uprights extending transversely to the compartments, and having movable sections corresponding to the compartments and adapted to be raised to give access to the compartments, each uppermost rail section overlapping the next lower section and co-operating therewith to facilitate skidding the material in a downward direction over the inclined skidding rail.

4. A rack for facilitating delivery of rod-like material of different sizes, comprising a supporting floor for the material, uprights carried by the floor dividing the same into compartments for the different sizes, and a skidding rail disposed over the compartments and having movable sections corresponding to the compartments, adapted to be raised to give access to the compartments, means for holding a quantity of collected material of different sizes, and located adjacent the delivery end of the rack, and means for guiding the material from the skidding rail onto the last-named means.

5. A rack for facilitating delivery of rod-like material of different sizes, comprising an inclined supporting floor for the material, uprights carried by the floor dividing the same into compartments for the different sizes, and an inclined skidding rail disposed over the compartments and having movable sections corresponding to the compartments, adapted to be raised to give access to the compartments, guiding means for receiving material from the rack to deliver the same beyond the guiding means, and disposed beyond the rack so that a gap is formed between the rack and the guiding means, material holding means located adjacent the said gap and below the level of the rack for receiving a quantity of collected material of different sizes, said guiding means operating to enable the material to be delivered at will over the same or down through the gap, and additional guiding means located at the gap for delivering the material onto the material holding means.

6. A rack for facilitating delivery of pipe of different sizes, comprising an inclined supporting floor for the pipe, uprights carried by the floor dividing the same into compartments for the different sizes, an inclined skidding rail disposed over the compartments and having movable sections corresponding to the compartments, adapted to be raised to give access to the compartments, guiding means disposed beyond the lower end of the floor whereby a gap is formed between the floor and the guiding means, means to facilitate the positioning of a receiving truck below the level of the floor to receive a quantity of collected pipe of different sizes, said guiding means operating at will to guide pipe across the gap or to permit the same to pass down into the gap, and additional guiding means for receiving the pipe descending through the gap and for guiding the same to the location of the truck.

7. A rack for facilitating delivery of pipe, of different sizes, comprising a supporting floor for the pipe, a plurality of standards carried by the floor for dividing the same into compartments for the different sizes of pipe, swivel heads carried by the said standards respectively, each swivel head having a rail section movably attached thereto and supported on an adjacent swivel head, whereby said swivel heads and rail sections co-operate to form skidding rails extending over the compartments for facilitating the movement and delivery of pipe from the compartments.

8. A rack for facilitating delivery of pipe, of different sizes, from a warehouse, comprising an inclined supporting floor for the pipe, uprights carried by the floor dividing the same into compartments for the different sizes of pipe, a pair of skidding rails disposed over the compartments and having movable sections corresponding to the compartments adapted to be raised to give access to the compartments, guiding means disposed beyond the lower end of the floor so as to form a gap between the same and the floor, said guiding means being located at the wall of the warehouse and operating to receive pipe from the rails and guide the same out of the warehouse to faclitate delivery of pipe to a truck on the outside, means for facilitating the positioning of a collecting truck below the level of the floor, means for operating said guiding means to permit pipe to descend through the gap, and additional guiding means for receiving pipe coming down through the gap and for guiding the same onto the collecting truck.

9. A rack for facilitating delivery of pipe of different sizes, comprising an inclined supporting floor for the pipe, uprights carried by the floor dividing the same into compartments for the different sizes of pipe, a pair of skidding rails disposed over the compartments and having movable sections corresponding to the compartments constructed to be raised at will to give access to the compartments, means for facilitating the positioning of a collecting truck below the level of the floor to collect pipes of different sizes taken from the different compartments, guide bars adjacent the lower end of the floor to receive the pipe from the skidding rails and guide the same to the collecting truck, and resilient means for supporting said guide bars.

10. A rack for facilitating the delivery of pipe of different sizes from a warehouse, comprising an inclined supporting floor for the pipe, uprights carried by the floor dividing the same into compartments for the different sizes of pipe, a pair of skidding rails disposed over the compartments and having movable sections corresponding to the compartments adapted to be raised to give access to the compartments, guiding means located beyond the lower end of the floor so as to form a gap between the guiding means and the floor, said guiding means having arms co-operating with the skidding rails to guide pipe over the gap to deliver the same beyond the guiding means, means for actuating said guiding means to swing the arms out of the path of pipe moving along the skidding rails, so as to permit the same to descend through the gap, and means for receiving and guiding the pipe to a delivery point below the gap.

Signed at Los Angeles, California, this 19th day of January, 1923.

HARRY F. HALDEMAN.